United States Patent
Schopf

(10) Patent No.: US 7,155,839 B2
(45) Date of Patent: Jan. 2, 2007

(54) PROBE HEAD

(75) Inventor: Reinhold Schopf, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 11/188,167

(22) Filed: Jul. 22, 2005

(65) Prior Publication Data

US 2006/0016087 A1    Jan. 26, 2006

(30) Foreign Application Priority Data

Jul. 23, 2004    (DE)    .................. 10 2004 035 926

(51) Int. Cl.
*G01B 5/016*    (2006.01)
(52) U.S. Cl. .......................... 33/561; 33/558
(58) Field of Classification Search ............. 33/561, 33/555, 556, 557, 558, 559, 560
See application file for complete search history.

(56) References Cited

U.S. PATENT DOCUMENTS

| | | | | | |
|---|---|---|---|---|---|
| 4,462,162 | A * | 7/1984 | McMurtry | .................. | 33/561 |
| 4,524,523 | A | 6/1985 | Golinelli et al. | | |
| 4,815,214 | A * | 3/1989 | Enderle et al. | ................ | 33/561 |
| 5,394,618 | A * | 3/1995 | Morz | ........................... | 33/559 |
| 5,659,969 | A * | 8/1997 | Butler et al. | .................. | 33/561 |
| 5,669,152 | A | 9/1997 | McMurtry | .................... | 33/559 |
| 6,708,420 | B1 * | 3/2004 | Flanagan | ..................... | 33/556 |
| 7,086,170 | B1 * | 8/2006 | Hajdukiewicz et al. | ....... | 33/558 |
| 2002/0066198 | A1 | 6/2002 | Schopf et al. | | |

FOREIGN PATENT DOCUMENTS

| | | |
|---|---|---|
| DE | 100 42 715 | 3/2002 |
| EP | 0 126 207 | 8/1989 |
| EP | 0 742 422 | 11/1996 |

\* cited by examiner

*Primary Examiner*—Christopher W. Fulton
(74) *Attorney, Agent, or Firm*—Kenyon & Kenyon LLP

(57) ABSTRACT

A probe head includes a housing and a probe element. The probe element has a longitudinal axis and stop faces and is able to shift from a rest position along the longitudinal axis into a stop position relative to the housing. The probe head further includes counter-support faces, which are arranged in a stationary manner relative to the housing. For limiting the path of the probe element, in a stop position, the stop faces of the probe element contact the counter-support faces at stop points. In the rest position, a geometric plane may be spanned orthogonally with respect to the longitudinal axis of the probe element. The stop points are arranged such that in the stop position, the longitudinal axis intersects the geometric plane at an oblique angle.

26 Claims, 4 Drawing Sheets

C – C

PROBE HEAD

CROSS-REFERENCE TO RELATED APPLICATIONS

The present application claims priority to Application No. 10 2004 035 926.1, filed in the Federal Republic of Germany on Jul. 23, 2004, which is expressly incorporated herein in its entirety by reference thereto.

FIELD OF THE INVENTION

The present invention relates to a probe head having a mechanical stop for a probe element.

BACKGROUND INFORMATION

A probe system may include a mobile probe head and a stationary part. The probe head in the form of a probe switch or a switching probe having a deflectable probe element, e.g., a feeler, which generates a switching signal in response to a deflection out of its rest position, may be used for determining the position of workpieces which are clamped into material-working machines, for example, machine tools. In this context, the rest position of the feeler is understood as a position in which the feeler has no contact with the workpiece to be probed. If the feeler makes contact with the workpiece, the feeler is deflected out of its rest position, and an electrical signal is generated by a suitable transducer if the deflection exceeds a specified probe threshold. The electrical signal may be converted into an infrared signal such that a contactless and wireless signal transmission to the stationary part of the probe system is achieved in this manner.

To block inadmissible paths of movement of the probe element in the event of a further, unintended movement of the probe head, mechanical stops may be provided as protective devices within the housing of such probe heads.

German Published Patent Application No. 100 42 715 describes a probe head, the feeler of which has a predetermined breaking point for limiting the stresses for the probe head in the event of an uncontrollable collision. However, excessive applications of force in the direction of the longitudinal axis of the feeler may not be safely absorbed.

European Published Patent Application No. 0 126 207 describes a probe head, in which stresses as a result of an uncontrolled collision in the direction of the longitudinal axis of the feeler are reduced in that the feeler is designed to have two parts, the adjoining faces of the parts of the feeler being beveled. Feelers of this kind may be relatively expensive to manufacture.

SUMMARY

An example embodiment of the present invention may provide a probe head that may be comparatively simple to manufacture and that may be insensitive with respect to uncontrolled collisions, e.g., in the case of a collision direction parallel to the longitudinal axis of the probe element.

According to an example embodiment of the present invention, the probe head may include a housing, on which a mechanical stop having counter-support points of the housing is arranged, and a probe element which also has stop faces. For limiting the path of the probe element, the probe element is able to shift from its rest position along (or parallel to) its longitudinal axis into a stop position relative to the housing. If the shift has a sufficient magnitude, the stop faces of the probe element contact the counter-support faces of the housing at stop points. In the rest position, a geometric plane may be spanned orthogonally with respect to the longitudinal axis of the probe element. The stop points are spatially arranged such that, in the stop position, the longitudinal axis of the probe element intersects the geometric plane at an oblique angle.

An oblique angle should be understood as an angle that is created if the longitudinal axis penetrates the respective plane in a non-orthogonal manner. In other words, the angle of intersection between the longitudinal axis and the geometric plane referred to as an oblique angle is not equal to 90°.

The described construction may be able to reduce the stress for the probe head significantly if an uncontrolled collision occurs in a movement parallel to the longitudinal axis of the probe element (with respect to its alignment in the rest position). For in this instance a bending moment or an increased buckling stress may be introduced into the probe element or the feeler. Accordingly, it may be possible to achieve in a reproducible manner reduced setpoint rupture forces in comparison to the buckling stress in conventional probe elements.

The probe head may be configured such that, described stereometrically, it may be possible to span a geometric plane through the stop points of the mechanical stop of the housing, which is intersected by the longitudinal axis in the rest position of the probe element at an oblique angle.

Alternatively, the probe head may also be configured such that the geometric plane, which may be spanned through the stop points of the probe element, is intersected by the longitudinal axis of the probe element at an oblique angle. Thus, the plane, in which the stop points of the probe element come to rest, is obliquely in space with respect to the longitudinal axis of the probe element. Both the plane of the counter-support points as well as the plane of the stop points may come to rest obliquely in space with respect to the longitudinal axis of the probe element in the rest position.

The housing may also have a longitudinal axis, this longitudinal axis being oriented in the rest position parallel to the longitudinal axis of the probe element. In the stop position, however, the longitudinal axis of the probe element is tilted relative to the longitudinal axis of the housing.

Example embodiments of the present invention may be used in combination with probe elements having a predetermined breaking point. The probe element may include a feeler holder and a feeler detachably secured to the feeler holder. The feeler or the feeler holder may be provided with a predetermined breaking point. For this purpose, the predetermined breaking point may be arranged approximately at the center of the probe element (with respect to the latter's longitudinal axis) because then there may be the greatest mechanical stress in the region of the predetermined breaking points.

The end of the feeler intended for making probing contact with a workpiece, for example, is referred to below as the probe end. The distance of the predetermined breaking point from the probe end may be greater than half of the free length of the feeler, e.g., greater than ⅔ of the free length of the feeler. In this manner, the predetermined breaking point is moved to a region in which comparatively greater stresses may occur in the probe element such that a more secure overload protection may be ensured.

Feelers may also be used in combination with example embodiments of the present invention, which may be made of a comparatively brittle ceramic material. In feelers of this kind, a special predetermined breaking point may be omitted.

According to an example embodiment of the present invention, a probe head includes: a housing; a probe element including a longitudinal axis and stop faces, the probe element shiftable relative to the housing between a rest position and a stop position, in the rest position, the longitudinal axis of the probe element arranged orthogonally with respect to a first geometric plane; and counter-support faces arranged stationary relative to the housing. In the stop position, the stop faces of the probe element contact the counter-support faces at stop points to limit a path of the probe element. The stop points are arranged so that, in the stop position, the longitudinal axis intersects the first geometric plane at an oblique angle.

The housing may include a longitudinal axis. In the rest position, the longitudinal axis of the housing may be parallel to the longitudinal axis of the probe element, and in the stop position, the longitudinal axis of the probe element may be tilted relative to the longitudinal axis of the housing.

The probe element may include a feeler holder and a feeler detachably secured to the feeler holder.

The probe element may include a predetermined breaking point.

The feeler may have a free length to a feeler end, and a distance of the predetermined breaking point from the feeler end may be greater than half the free length, e.g., greater than ⅔ the free length.

The probe head may include an optical device adapted to detect a deflection of the probe element from the rest position.

The optical device may include a lens system secured to the feeler holder.

The stop points on the counter-support faces may be arranged in a second geometric plane, and in the rest position, the longitudinal axis of the probe element may intersect the second geometric plane at an oblique angle.

The stop points on the stop faces may be arranged in a second geometric plane, and the longitudinal axis of the probe element may intersect the second geometric plane at a right angle.

According to an example embodiment of the present invention, probe head includes: a housing including counter-support faces; and a probe element including a longitudinal axis and stop faces, the probe element shiftable relative to the housing between a rest position and a stop position. In the stop position, the stop faces of the probe element contact the counter-support faces at stop points to limit a path of the probe element. The stop points of the counter-support faces are arranged in a plane intersected by the longitudinal axis of the probe element in the rest position at an oblique angle.

The housing may include a longitudinal axis. In the rest position, the longitudinal axis of the housing may be parallel to the longitudinal axis of the probe element. In the stop position, the longitudinal axis of the probe element may be tilted relative to the longitudinal axis of the housing.

The probe element may include a feeler holder and a feeler detachably secured to the feeler holder.

The probe element may include a predetermined breaking point.

The feeler may have a free length to a feeler end, and a distance of the predetermined breaking point from the feeler end may be greater than half the free length, e.g., greater than ⅔ the free length.

The probe head may include an optical device adapted to detect a deflection of the probe element from the rest position.

The optical device may include a lens system secured to the feeler holder.

According to an example embodiment of the present invention, probe head includes: a housing including counter-support faces; and a probe element including a longitudinal axis and stop faces, the probe element shiftable relative to the housing between a rest position and a stop position. In the stop position, the stop faces of the probe element contact the counter-support faces at stop points to limit a path of the probe element. The stop points on the stop faces are arranged in a plane intersected by the longitudinal axis at an oblique angle.

The housing may include a longitudinal axis. In the rest position, the longitudinal axis of the housing may be parallel to the longitudinal axis of the probe element. In the stop position, the longitudinal axis of the probe element may be tilted relative to the longitudinal axis of the housing.

The probe element may include a feeler holder and a feeler detachably secured to the feeler holder.

The probe element may include a predetermined breaking point.

The feeler may have a free length to a feeler end, and a distance of the predetermined breaking point from the feeler end may be greater than half the free length, e.g., greater than ⅔ the free length.

The probe head may include an optical device adapted to detect a deflection of the probe element from the rest position.

The optical device may include a lens system secured to the feeler holder.

Further details and aspects of example embodiments of the present invention are described below with reference to the appended Figures.

DETAILED DESCRIPTION

FIG. 1b is a cross-sectional view of the probe head in the rest position taken along the line C—C illustrated in FIG. 1a.

FIG. 4 is a cross-sectional view of the probe head in the stop position taken along the line C—C illustrated in FIG. 1a.

DETAILED DESCRIPTION

Figure 1A:
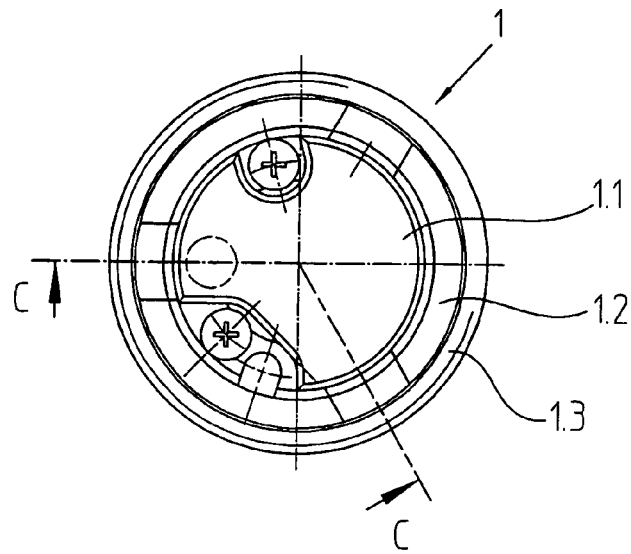
FIG. 1a is a top view of a probe head.

FIG. 1a is a top view of a probe head. FIG. 1a illustrates the cap 1.1 belonging to a housing 1.

Figure 1B:
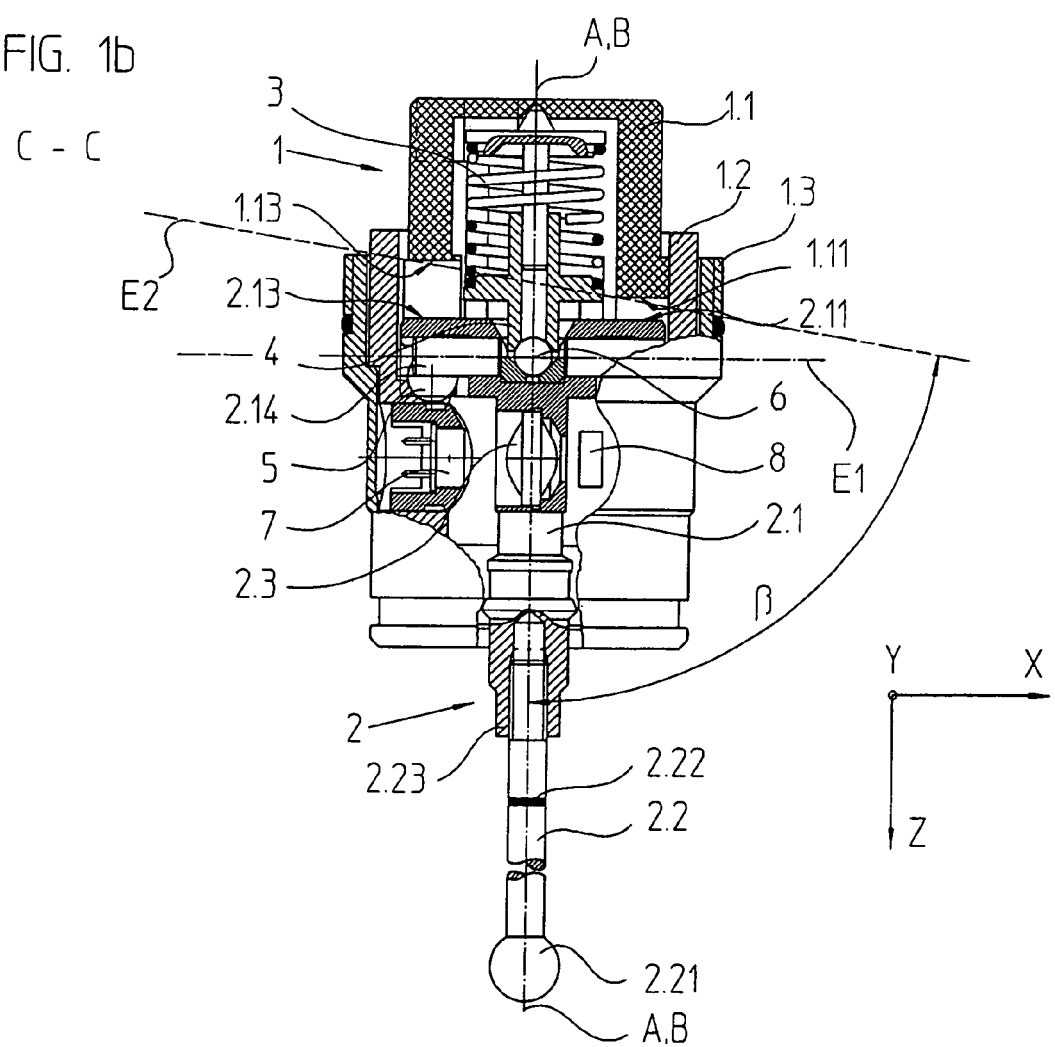

FIG. 1b is a cross-sectional view of the probe head in the rest position taken along the line C—C illustrated in FIG. 1a. In addition to cap 1.1, housing 1 includes two further housing parts 1.2, 1.3. A probe element 2 projects out of the lower region of housing 1. Probe element 2 has a longitudinal axis A, which in the rest state or in the rest position at the same time represents the longitudinal axis B of housing 1. In the exemplary embodiment illustrated, probe element 2 includes two parts, e.g., a feeler holder 2.1 and a feeler 2.2, to which in FIG. 1b at the bottom a probing contact sphere 2.21 is attached as a feeler end. Feeler 2.2 further has a predetermined breaking point 2.22. Feeler holder 2.1 and feeler 2.2 are detachably connected to each other by a screw connection 2.23.

In the rest position, a geometric plane E1 may be spanned, which is orthogonally with respect to longitudinal axis A of probe element 2, this plane E1 also being oriented perpendicularly with respect to the drawing plane of FIG. 1b and thus able to be indicated in FIG. 1b as a simple dashed line. The normal vector of plane E1 thus is parallel with respect to longitudinal axis A of probe element 2 in the rest position.

Figure 3:
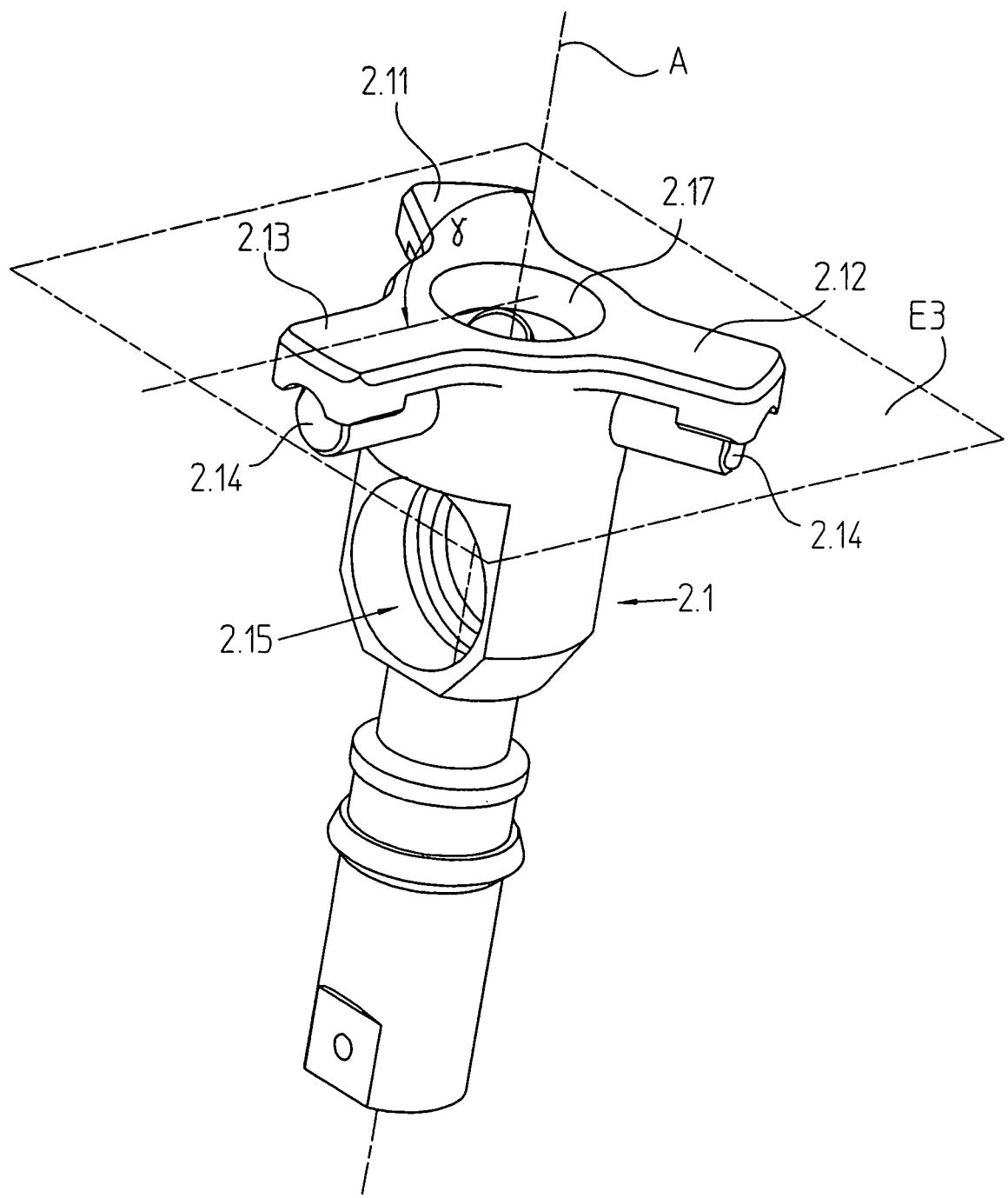
FIG. 3 is a perspective view of a feeler holder of a probe element.

As illustrated in FIG. 3, feeler holder 2.1 of probe element 2 has three arms at one end. The topside of each arm includes one stop face 2.11 to 2.13, the function of which is explained below. Stop faces 2.11 to 2.13 are arranged in a plane E3, which is orthogonal with respect to longitudinal axis A of probe element 2. In the exemplary embodiment illustrated, longitudinal axis A of probe element 2 thus intersects geometric plane E3 at an angle γ=90°.

In addition, a centered opening 2.17 is also provided on the topside of feeler holder 2.1. In each instance, a so-called support cylinder 2.14 is arranged on the underside of the three arms. Further, feeler holder 2.1 includes a bore hole 2.15 in which a lens system 2.3 is attached (see, e.g., FIG. 1b).

As illustrated in FIG. 1b, the three support cylinders 2.14 each rest on two balls 5 in the rest position of the probe head. Balls 5 are supported by housing part 1.2. In order for probe element 2 to remain in its rest position, it is ultimately pressed onto housing 1 by a spring 3 via an intermediate piece 4 and a centering ball 6. To this end, centering ball 6 rests in opening 2.17 and thus is arranged between feeler holder 2.1 of probe element 2 and intermediate piece 4. The upper end of spring 3 illustrated in FIG. 1b is thus supported by cap 1.1, while the lower end of spring 3 presses on intermediate piece 4 and thus on probe element 2.

A deflection of probe element 2 from its rest position is detected by an optically operating device. Accordingly, a light source 7 is provided in housing 1, which emits light that emerges substantially perpendicular with respect to longitudinal axis A of probe element 2. The emitted light then enters a lens system 2.3, which is attached within bore hole 2.15 in feeler holder 2.1 of probe element 2. The light emerging from lens system 2.3 subsequently strikes a photo-element 8 which is configured as a differential photo-element in the exemplary embodiment illustrated.

Figure 2A:
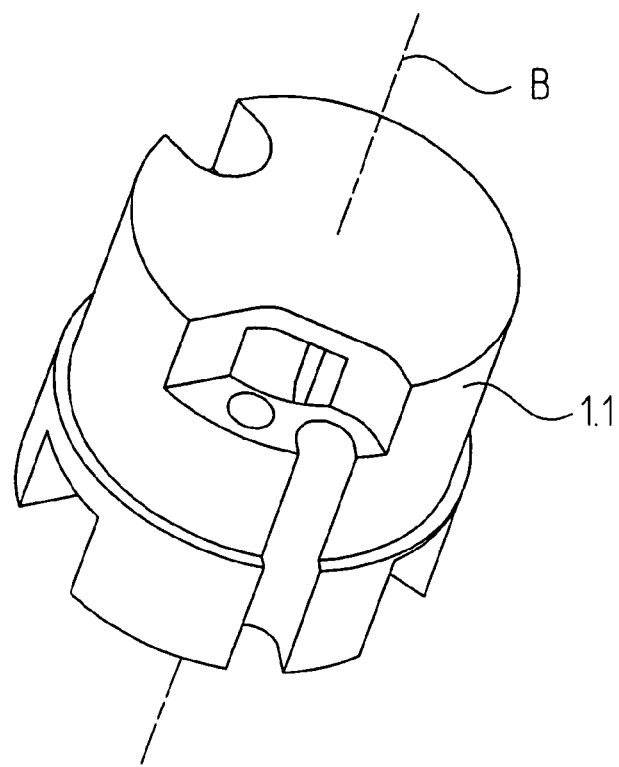
FIG. 2a is a perspective view of a cap of the probe head.
Figure 2B:
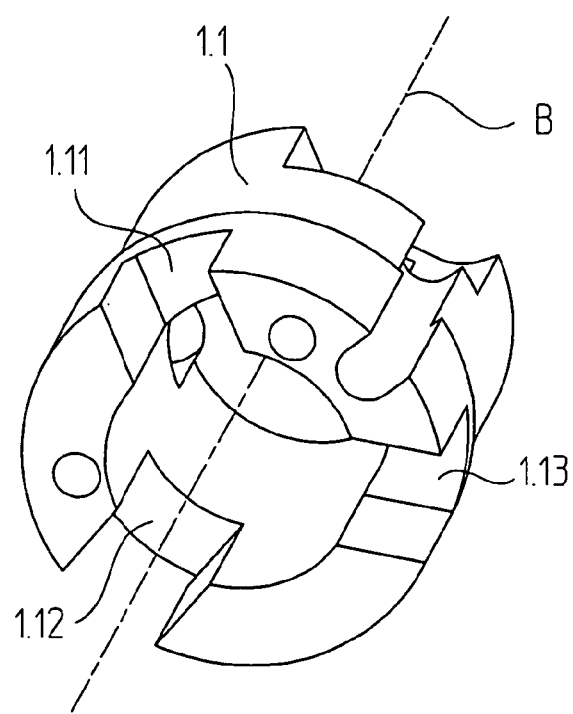
FIG. 2b is another perspective view of a cap of the probe head.

FIGS. 2a and 2b are perspective views of cap 1.1 which is to be assigned to housing 1. Cap 1.1 has three recesses, each offset along the circumference by 120°. The end faces of the recesses form counter-support faces 1.11, 1.12, 1.13. Two recesses in the axial direction of the cap are made to be of equal depth, while the third recess is deeper in the axial direction. In other words, two counter-support faces 1.11, 1.12 are arranged at the same level, while the third counter-support face 1.13 is axially offset with respect to the first two counter-support faces 1.11, 1.12. Like the entire cap 1.1, counter-support faces 1.11, 1.12, 1.13 are arranged in a fixed or stationary manner relative to housing 1.

In a measuring operation, the probe head travels, for example, within the machining space of a machine tool, in the direction of the X axis. As soon as probing contact sphere 2.21 contacts an obstacle—e.g., a workpiece to be measured—the entire probe element 2 is deflected. That is, counter to the force of spring 3, at least one of the support cylinders 2.14 lifts off slightly and, due to the inclination of longitudinal axis A of probe element 2, lens system 2.3 is inclined as well. This albeit minimal movement causes a deflection in the light beam in lens system 2.3, which is detected by photo-element 8. Triggered by a corresponding signal of photo-element 8, the probe head sends a signal to a stationary part, which is fixed to an immobile component of the machine tool, for example. From this stationary part, the signal is transmitted, for example, in the control system of the machine tool, where the position of probing contact sphere 2.21 is determined and at the same time the machine is stopped. For mechanical safeguarding or for protecting the probe head, however, predetermined breaking point 2.22 is additionally provided in feeler 2.2. This is because in the case of an unfavorable geometry of the body to be probed, but also in the event of an excessive travel speed of the probe head or of a faulty signal transmission etc., there may be the danger of an excessive deflection of probe element 2. Before an inadmissible deflection may occur, however, feeler 2.2 may break off at predetermined breaking point 2.22.

Within the machining space of a machine tool, the probe head is able to travel not only in the X or Y direction, but in the direction of the Z axis as well, which here extends parallel to longitudinal axis A of probe element 2. If in this direction of travel, probing contact sphere 2.21 strikes upon an obstacle or workpiece, probe element 2 is shifted along—or parallel to—longitudinal axis A of probe element 2 from the rest position relative to housing 1 and spring 3 is compressed. Normally, this shift triggers a stop of the travel. For many different reasons it may be, however, that this stop is not triggered or is triggered late. In this event, a mechanical stop in the Z direction or in the direction of longitudinal axis A of probe element 2 is provided.

If probe element 2 is shifted from its rest position along longitudinal axis A (according to the latter's orientation in the rest position), then first the stop faces 2.11, 2.12 of feeler holder 2.1 will contact the counter-support face 1.11, 1.12 of cap 1.1. As described above, the recess by which counter-support face 1.13 is formed in the end is deeper than the two other corresponding recesses in cap 1.1. In the event of a further shift of probe element 2 relative to housing 1 or to cap 1.1 in the Z direction, longitudinal axis A will then first initiate a tilting motion and will then in the further motion sequence incline until the third stop face 2.13 also contacts the corresponding counter-support face 1.13.

Figure 4:
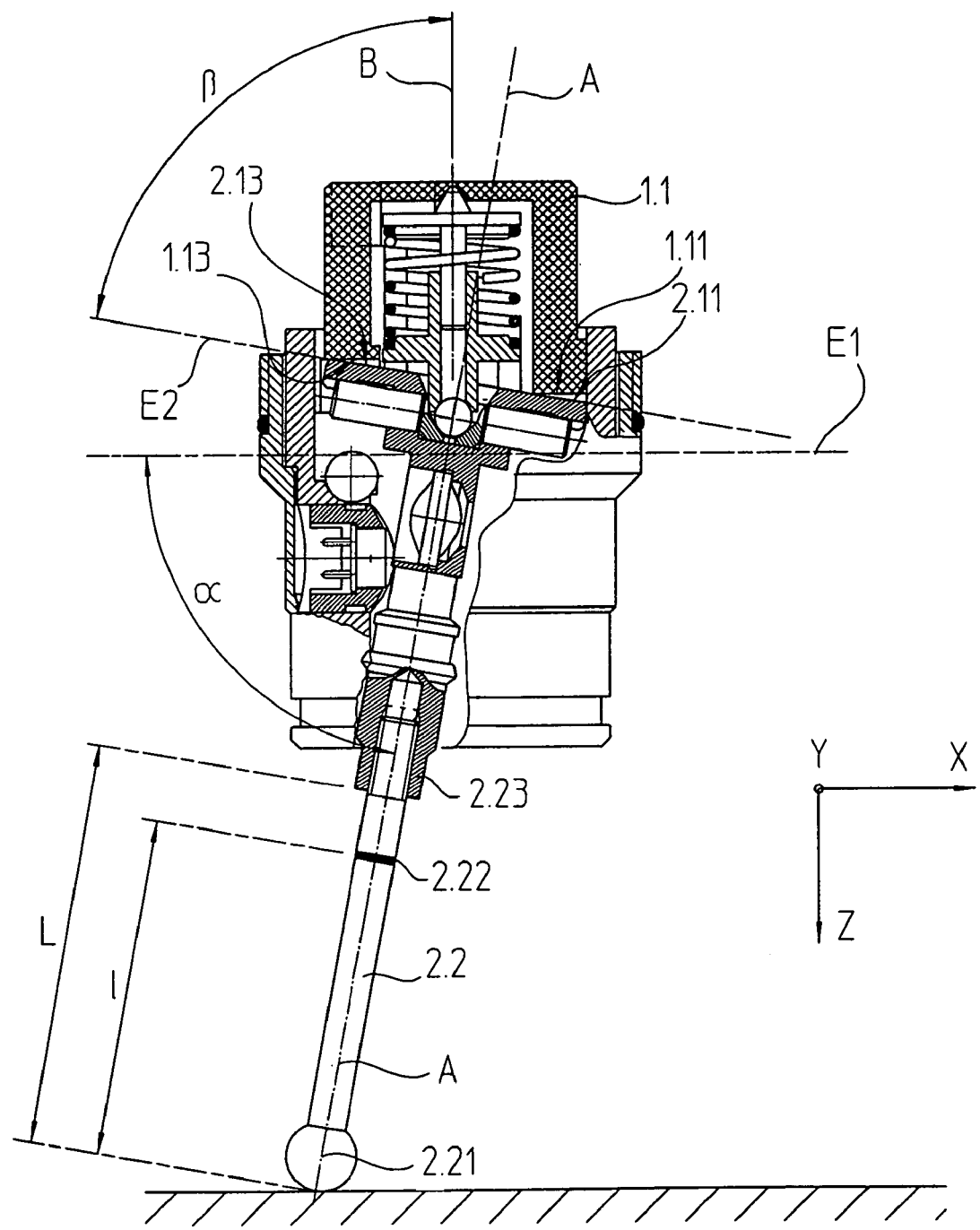

FIG. 4 illustrates this state in which probe element 2 is arranged in the stop position. In the stop position, stop faces 2.11, 2.12, 2.13 of probe element 2 contact counter-support faces 1.11, 1.12, 1.13 at three stop points or contact points. The stop points are arranged such that, or come to rest due to the configuration of stop faces 2.11, 2.12, 2.13 and counter-support faces 1.11, 1.12, 1.13, such that longitudinal axis A now intersects geometric plane E1 at an oblique angle α. As described above, plane E1 is a plane that is oriented orthogonally with respect to longitudinal axis A of probe element 2 in the rest position.

If stop faces 2.11, 2.12, 2.13 and counter-support faces 1.11, 1.12, 1.13 are designed to be extremely small, then, in this boundary view, stop faces 2.11, 2.12, 2.13 and counter-support faces 1.11, 1.12, 1.13 may be equated to the stop points.

Considered geometrically, a second plane E2 may be spanned through the stop points in the exemplary embodiment illustrated, or an imaginary plane may be formed, in which all three stop points come to rest. As indicated in FIGS. 1b and 4, in the rest position, longitudinal axis A of probe element 2 intersects plane E2 formed according to the above definition at an oblique angle β, deviating from a right angle.

In this manner, therefore, probe element 2 together with its feeler 2.1 undergoes a tilting or inclining motion in the event that there is an excessive travel in the Z direction if probing contact sphere 2.21 is already in contact with a workpiece. In the stop position of probe element 2, longitudinal axis B of housing 1 now no longer coincides with longitudinal axis A of probe element 2. In the rest position, however, longitudinal axis B of housing 1 is aligned parallel to longitudinal axis A of probe element 2, the two axes even being congruent in the exemplary embodiment illustrated, while in the stop position longitudinal axis A of probe element 2 is tilted relative to longitudinal axis B of housing 1.

Due to the inclination or tilting of feeler 2.1, the latter is no longer subjected to buckling stress, but rather a bending stress is introduced into feeler 2.1. Predetermined breaking point 2.22 is already configured for such bending stresses since this is supposed to absorb excessive stresses when there is a travel in the X direction (and likewise in the Y direction).

The friction conditions may also take a form such that no relative shifting may occur between probing contact sphere 2.21 and the workpiece surface and that thus no distinct tilting movement of probe element 2 occurs. In this instance, too, however, example embodiments of the present invention may develop its effect since in this state at least one of stop faces 2.11, 2.12, 2.13 of feeler holder 2.1 will not rest on the housing such that the buckling stress on feeler 2.2 and thus also on predetermined breaking point 2.22 may be increased with respect to conventional systems.

As illustrated in FIG. 4, predetermined breaking point 2.22 is provided in the upper region of feeler 2.1, e.g., the distance between predetermined breaking point 2.22 and probing contact sphere 2.21 is greater than the distance between predetermined breaking point 2.22 and screw connection 2.23. To illustrate this aspect, FIG. 4 illustrates the free length L of feeler 2.2. The free length L should be understood as that length of feeler 2.2 that extends between the clamping, in this instance screw connection 2.23, and the end of the feeler, in this instance probing contact sphere 2.21. The distance of predetermined breaking point 2.22 from probing contact sphere 2.21 is indicated by the character l in FIG. 4. As indicated in FIG. 4, the distance of predetermined breaking point 2.22 from the probe end or from probing contact sphere 2.21 is significantly greater than half the free length L and even greater than ⅔ of free length L. This may provide that predetermined breaking point 2.2 is positioned into a region of high mechanical stress. In terms of the entire probe element 2, the predetermined breaking point 2.22 comes to rest approximately at its center, the term center here referring to its extension in longitudinal axis A.

As an alternative, feeler holder 2.2 may also be configured such that plane E3, in which the stop faces or the stop points come to rest, is not arranged orthogonally with respect to longitudinal axis A ($\gamma \neq 90°$). Accordingly, the counter-support points on the housing may then either be in a plane that is oriented orthogonally with respect to longitudinal axis A (in relation to the orientation in the rest position), or an arrangement may be chosen, in which the plane of the counter-support points is also arranged obliquely in space with respect to longitudinal axis A (in relation to the orientation in the rest position). The stop points may be spatially arranged such that in the stop position, longitudinal axis A intersects geometric plane E1, which is formed in the rest position, at an oblique angle $\alpha$. In this alternative exemplary embodiment, probe element 2 also performs an inclining or tilting movement if it travels in the Z direction into a stop position.

What is claimed is:

1. A probe head, comprising:
    a housing;
    a probe element including a longitudinal axis and stop faces, the probe element shiftable relative to the housing between a rest position and a stop position, in the rest position, the longitudinal axis of the probe element arranged orthogonally with respect to a first geometric plane; and
    counter-support faces arranged stationary relative to the housing;
    wherein, in the stop position, the stop faces of the probe element contact the counter-support faces at stop points to limit a path of the probe element, the stop points arranged so that, in the stop position, the longitudinal axis intersects the first geometric plane at an oblique angle.

2. The probe head according to claim 1, wherein the housing includes a longitudinal axis, in the rest position, the longitudinal axis of the housing parallel to the longitudinal axis of the probe element, in the stop position, the longitudinal axis of the probe element tilted relative to the longitudinal axis of the housing.

3. The probe head according to claim 1, wherein the probe element includes a feeler holder and a feeler detachably secured to the feeler holder.

4. The probe head according to claim 3, wherein the probe element includes a predetermined breaking point, the feeler having a free length to a feeler end, a distance of the predetermined breaking point from the feeler end greater than half the free length.

5. The probe head according to claim 3, wherein the probe element includes a predetermined breaking point, the feeler having a free length to a feeler end, a distance of the predetermined breaking point from the feeler end greater than ⅔ the free length.

6. The probe head according to claim 3, further comprising an optical device adapted to detect a deflection of the probe element from the rest position, the optical device including a lens system secured to the feeler holder.

7. The probe head according to claim 1, wherein the probe element includes a predetermined breaking point.

8. The probe head according to claim 1, further comprising an optical device adapted to detect a deflection of the probe element from the rest position.

9. The probe head according to claim 1, wherein the stop points on the counter-support faces are arranged in a second geometric plane, in the rest position, the longitudinal axis of the probe element intersecting the second geometric plane at an oblique angle.

10. The probe head according to claim 1, wherein the stop points on the stop faces are arranged in a second geometric plane, the longitudinal axis of the probe element intersecting the second geometric plane at a right angle.

11. A probe head, comprising:
    a housing including counter-support faces; and
    a probe element including a longitudinal axis and stop faces, the probe element shiftable relative to the housing between a rest position and a stop position;
    wherein, in the stop position, the stop faces of the probe element contact the counter-support faces at stop points to limit a path of the probe element; and
    wherein the stop points of the counter-support faces are arranged in a plane intersected by the longitudinal axis of the probe element in the rest position at an oblique angle.

12. The probe head according to claim 11, wherein the housing includes a longitudinal axis, in the rest position, the longitudinal axis of the housing parallel to the longitudinal axis of the probe element, in the stop position, the longitudinal axis of the probe element tilted relative to the longitudinal axis of the housing.

13. The probe head according to claim 11, wherein the probe element includes a feeler holder and a feeler detachably secured to the feeler holder.

14. The probe head according to claim 13, wherein the probe element includes a predetermined breaking point, the feeler having a free length to a feeler end, a distance of the predetermined breaking point from the feeler end greater than half the free length.

15. The probe head according to claim 13, wherein the probe element includes a predetermined breaking point, the feeler having a free length to a feeler end, a distance of the predetermined breaking point from the feeler end greater than $2/3$ the free length.

16. The probe head according to claim 13, further comprising an optical device adapted to detect a deflection of the probe element from the rest position, the optical device including a lens system secured to the feeler holder.

17. The probe head according to claim 11, wherein the probe element includes a predetermined breaking point.

18. The probe head according to claim 11, further comprising an optical device adapted to detect a deflection of the probe element from the rest position.

19. A probe head, comprising:
a housing including counter-support faces; and
a probe element including a longitudinal axis and stop faces, the probe element shiftable relative to the housing between a rest position and a stop position;
wherein, in the stop position, the stop faces of the probe element contact the counter-support faces at stop points to limit a path of the probe element; and
wherein the stop points on the stop faces are arranged in a plane intersected by the longitudinal axis at an oblique angle.

20. The probe head according to claim 19, wherein the housing includes a longitudinal axis, in the rest position, the longitudinal axis of the housing parallel to the longitudinal axis of the probe element, in the stop position, the longitudinal axis of the probe element tilted relative to the longitudinal axis of the housing.

21. The probe head according to claim 19, wherein the probe element includes a feeler holder and a feeler detachably secured to the feeler holder.

22. The probe head according to claim 21, wherein the probe element includes a predetermined breaking point, the feeler having a free length to a feeler end, a distance of the predetermined breaking point from the feeler end greater than half the free length.

23. The probe head according to claim 21, wherein the probe element includes a predetermined breaking point, the feeler having a free length to a feeler end, a distance of the predetermined breaking point from the feeler end greater than $2/3$ the free length.

24. The probe head according to claim 21, further comprising an optical device adapted to detect a deflection of the probe element from the rest position, the optical device including a lens system secured to the feeler holder.

25. The probe head according to claim 19, wherein the probe element includes a predetermined breaking point.

26. The probe head according to claim 19, further comprising an optical device adapted to detect a deflection of the probe element from the rest position.

* * * * *